United States Patent

Jagadish et al.

Patent Number: 5,844,972
Date of Patent: Dec. 1, 1998

[54] CUSTOMER PROFILE BASED TELEPHONE CARD BILLING

[75] Inventors: Hosagrahar V. Jagadish; Inderpal S. Mumick, both of Berkeley Heights, N.J.

[73] Assignee: AT&T Corp., Middletown, N.J.

[21] Appl. No.: 821,352

[22] Filed: Mar. 20, 1997

[51] Int. Cl.⁶ .................................................. H04M 15/00
[52] U.S. Cl. ........................ 379/114; 379/111; 379/127; 379/126; 379/144
[58] Field of Search .............................. 379/91.01, 91.02, 379/111, 112, 114, 115, 118, 120, 121, 124, 126, 127, 134, 144

[56] References Cited

U.S. PATENT DOCUMENTS

| | | | |
|---|---|---|---|
| 4,979,207 | 12/1990 | Bau et al. | 379/112 |
| 5,146,491 | 9/1992 | Silver et al. | 379/114 |
| 5,206,899 | 4/1993 | Gupta et al. | 379/120 |
| 5,222,125 | 6/1993 | Creswell et al. | 379/67 |
| 5,291,543 | 3/1994 | Freese et al. | 379/114 |
| 5,381,467 | 1/1995 | Rosinski et al. | 379/121 |
| 5,384,831 | 1/1995 | Creswell et al. | 379/67 |
| 5,450,477 | 9/1995 | Amarant et al. | 379/93 |
| 5,481,600 | 1/1996 | Alesio | 379/112 |
| 5,506,893 | 4/1996 | Buscher et al. | 379/114 |
| 5,544,229 | 8/1996 | Creswell et al. | 379/67 |
| 5,553,131 | 9/1996 | Minervino, Jr. et al. | 379/221 |
| 5,557,664 | 9/1996 | Burns et al. | 379/114 |
| 5,568,541 | 10/1996 | Greene | 379/114 |
| 5,577,101 | 11/1996 | Böhm | 379/119 |
| 5,579,379 | 11/1996 | D'Amico et al. | 379/112 |
| 5,581,607 | 12/1996 | Richardson, Jr. et al. | 379/88 |
| 5,592,537 | 1/1997 | Moen | 379/67 |
| 5,633,919 | 5/1997 | Hogan et al. | 379/115 |
| 5,675,636 | 10/1997 | Gray | 379/114 |

Primary Examiner—Curtis A. Kuntz
Assistant Examiner—Binh K. Tieu

[57] ABSTRACT

A method and system in which calls made by a customer using a calling card are billed in accordance with the customer's subscribed calling plans. In order to price a call made over a network by a customer of the network, information specifying a billing plan of the customer is stored. A call made from a customer station or using a customer calling card or prepaid telephone card is received at a network switch and record that describes the call is generated. The record is received at a billing analysis system and a priced call value for the call is determined based on the record and the information specifying the customer billing plan. If the call is placed using a prepaid telephone card, it is verified that a sufficient balance remains before completing the call.

20 Claims, 6 Drawing Sheets

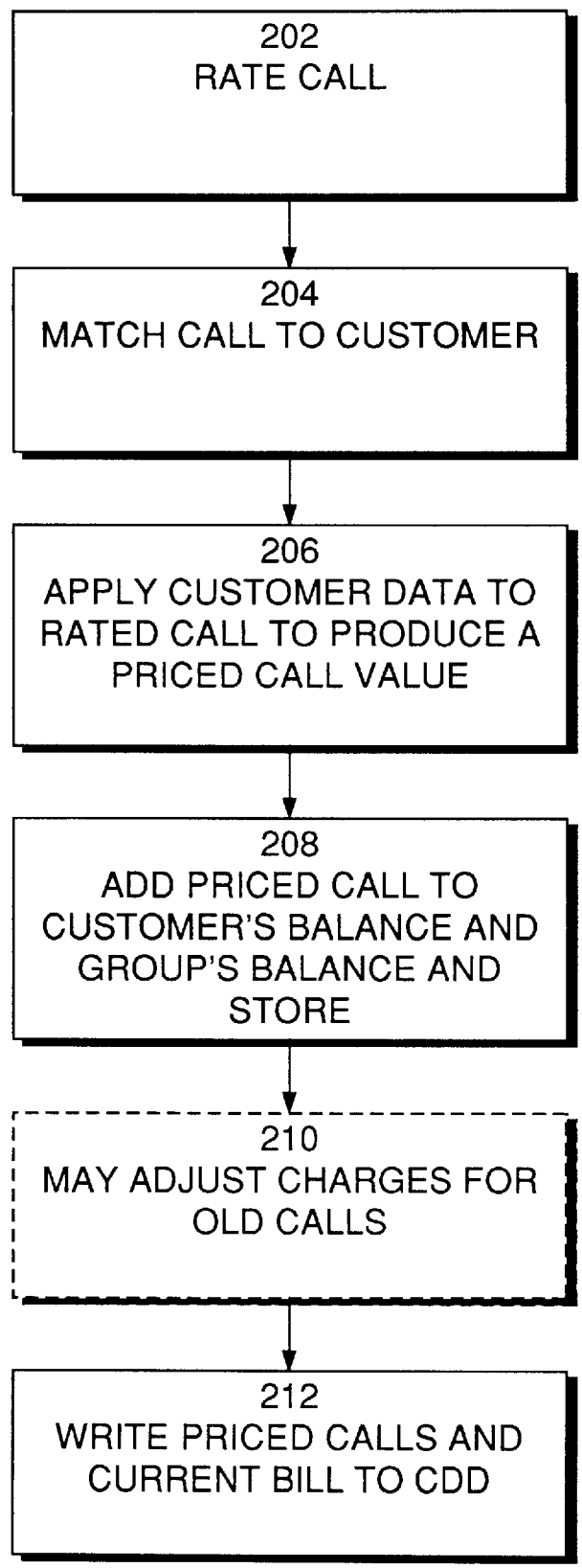

CUSTOMER PROFILE BASED TELEPHONE CARD BILLING

FIELD OF THE INVENTION

The present invention relates to the processing of telephone calls, and in particular, to the billing of the costs of such calls.

Background of the Invention

Discount telephone billing plans have become commonplace. In a typical plan, a customer receives a discount on all calls made from a particular number, if total usage exceeds a predefined time or monetary limit. However, the calling plans to which the customer subscribes do not apply to calls made using a calling card or a prepaid telephone card. It would be useful if a customer's subscribed calling plans applied to calls the customer makes using a calling card or a prepaid telephone card.

SUMMARY OF THE INVENTION

The present invention is a method and system in which calls made by a customer using a calling card or a prepaid telephone card are billed in accordance with the customer's subscribed calling plans.

In order to price a call made over a network by a customer of the network, according to the present invention, information specifying a billing plan of the customer is stored. A call made from a customer station or using a customer calling card or prepaid telephone card is received at a network switch and a record that describes the call is generated. The record is received at a billing analysis system and a priced call value for the call is determined based on the record and the information specifying the customer billing plan. If the call is placed using a prepaid telephone card, it is verified that a sufficient balance remains before completing the call.

BRIEF DESCRIPTION OF THE DRAWINGS

The details of the present invention, both as to its structure and operation, can best be understood by referring to the accompanying drawings, in which like reference numbers and designations refer to like elements.

FIG. 2a is a flowchart depicting the steps involved in a procedure that a billing analysis system may use to perform billing processing for each call, according to the present invention.

DETAILED DESCRIPTION OF THE INVENTION

Figure 1A:
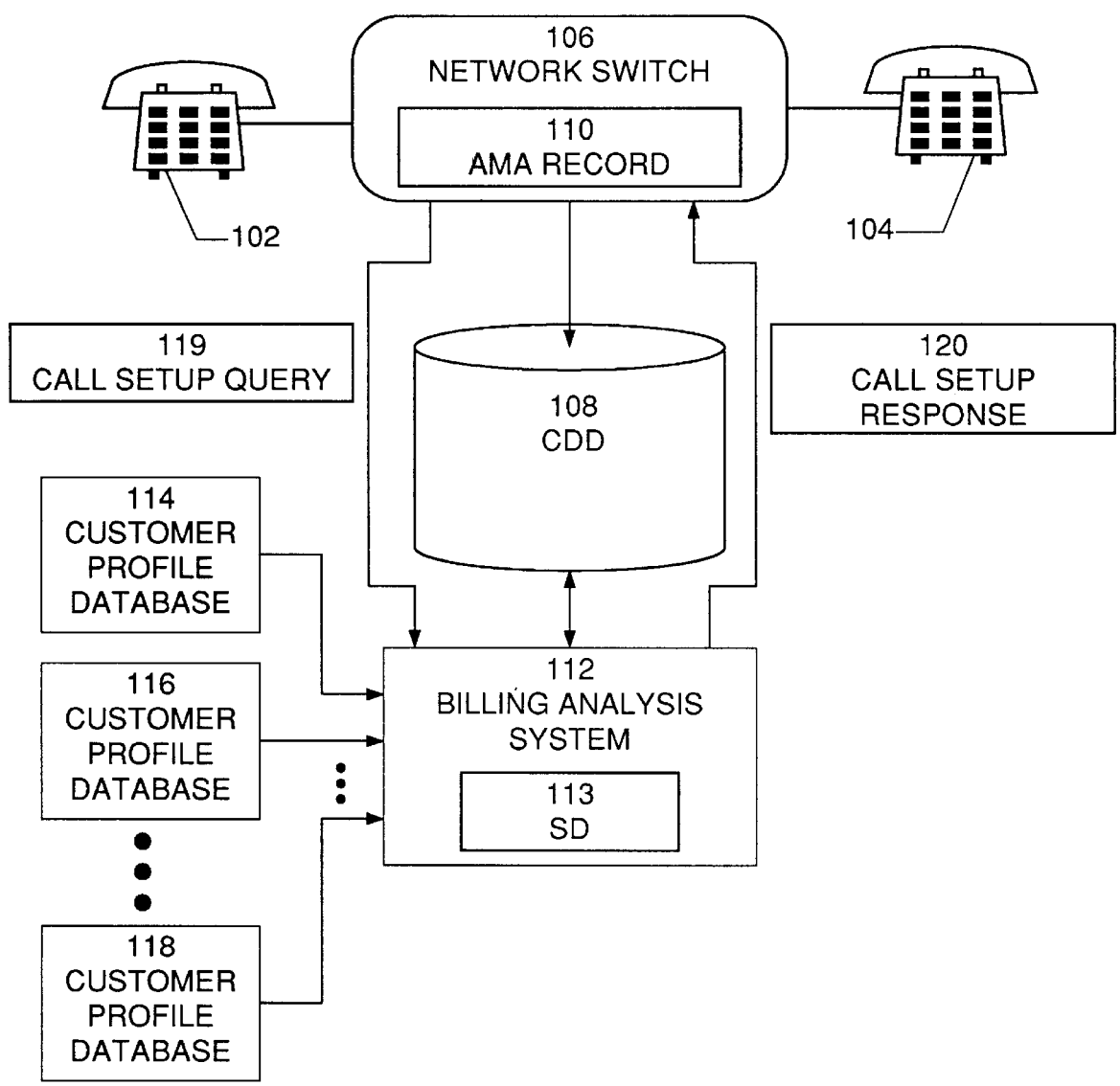
FIG. 1a is a block diagram of one embodiment a telephone call billing system, in which the present invention may be implemented.

Referring to FIG. 1a, there is shown a block diagram of a telephone system in accordance with one embodiment of the present invention. There is shown a calling telephone 102, a called telephone 104, a telephone network switch 106 and a Call Detail Database (CDD) 108. An Automatic Message Accounting (AMA) record, represented by a block 110, is also shown. As indicated by the figure, a billable call may be initiated at telephone 102 and routed through switch 106, e.g., an AT&T 4 ESS® switch, to telephone 104. The switch generates AMA record 110, which includes the information necessary to rate the call. The AMA record is passed to CDD 108. It should be noted here that there are an abundance of protocols and transmission media that may be used for passing the data from the switch to the CDD. For example, suitable protocols include the well known File Transfer Protocol (FTP) and Transmission Control Protocol/Internet Protocol; and suitable transmission media include twisted shielded pair wires, fiber optic lines, coaxial cable, and wireless links. Moreover, these protocols and media are suitable for use in all data transfers and queries hereinafter described.

In any event, once the AMA record has been passed to the CDD, it is available for use in pricing the call. To this end, the AMA record is passed to a billing analysis system 112, which may be a general purpose computer capable of running the software necessary to implement the invention. The billing analysis system applies any customer specific billing parameters to the AMA record to produce a processed AMA record. It then passes both the AMA record and the processed AMA record back to the CDD for storage. A method for passing the data back to the CDD is disclosed in co-pending, commonly assigned, U.S. patent application Ser. No.: 08/607,983 —entitled "Compression and Buffering of a Stream with Data Extraction Requirements"—which application is incorporated herein by reference.

The billing analysis system performs its functions the instant the switch passes the AMA record to the CDD (i.e. it performs call pricing in real-time). In order to achieve real-time processing of AMA records the invention must overcome two primary obstacles. First, the customer specific data is fragmented across multiple business units, with no cohesive notion of an integrated customer profile. This situation is depicted in FIG. 1a, which shows several customer profile databases 114, 116 and 118. As shown in the figure, the invention overcomes this obstacle through the use of an integrated customer profile database located within the billing analysis system. Software tools update the integrated customer profile database in response to updates of the individual customer profiles 114, 116 and 118 so that the integrated database always contains current information on all customers.

The volume of customer and telephone call data makes it difficult to store, rate, and query call data in real-time. To surmount this obstacle the invention accumulates summary information as each individual call (AMA) record is received and rated in real-time. It is generally desirable for a telephone network to maintain a customer's current bill. Thus, one type of accumulated summary information may be current bills for each network customer. Nevertheless, it may be useful to accumulate other types of summary information for particular customers. The nature of the accumulated summary information for a particular customer depends upon the services subscribed to by that customer. For example, a customer may subscribe to a plan in which calls made during the hours between 5:00pm and 9:00am receive a 10% discount; in which case it is useful to maintain a summary field containing the number of minutes of calls that the customer has made during the discount period.

In any case, the summary information is stored in a Summary Database (SD) 113 that is located within the billing analysis system. Thus, in this embodiment, AMA records and processed AMA records are stored in the CDD, while summary information is stored in the SD. It should be noted that many alternative storage schemes may be employed without departing from the spirit of the invention. For example, in one alternative scheme, AMA records are stored in the CDD, summary information are stored in the SD, and processed AMA records are stored in both the CDD and SD.

One use for real-time access to summary information involves call setup query 119. When a call is initiated, for example, by telephone station 102, and routed to network switch 106, before the call is connected to the destination station, for example, station 104, switch 106 may transmit a call setup query 119 to billing analysis system 112. The call setup query includes information identifying the customer that placed the call. Typically the Automatic Number Identification (ANI) is used for this purpose. In an ANI system, the number of the telephone station from which a call is initiated is determined and used to identify the party who initiated the call. The call setup query also includes information identifying the destination of the call and may include other information. In response to receiving query 119, billing analysis system 112 may access summary information stored in SD 113 and generate a call setup response 120 based on the summary information.

Figure 1B:
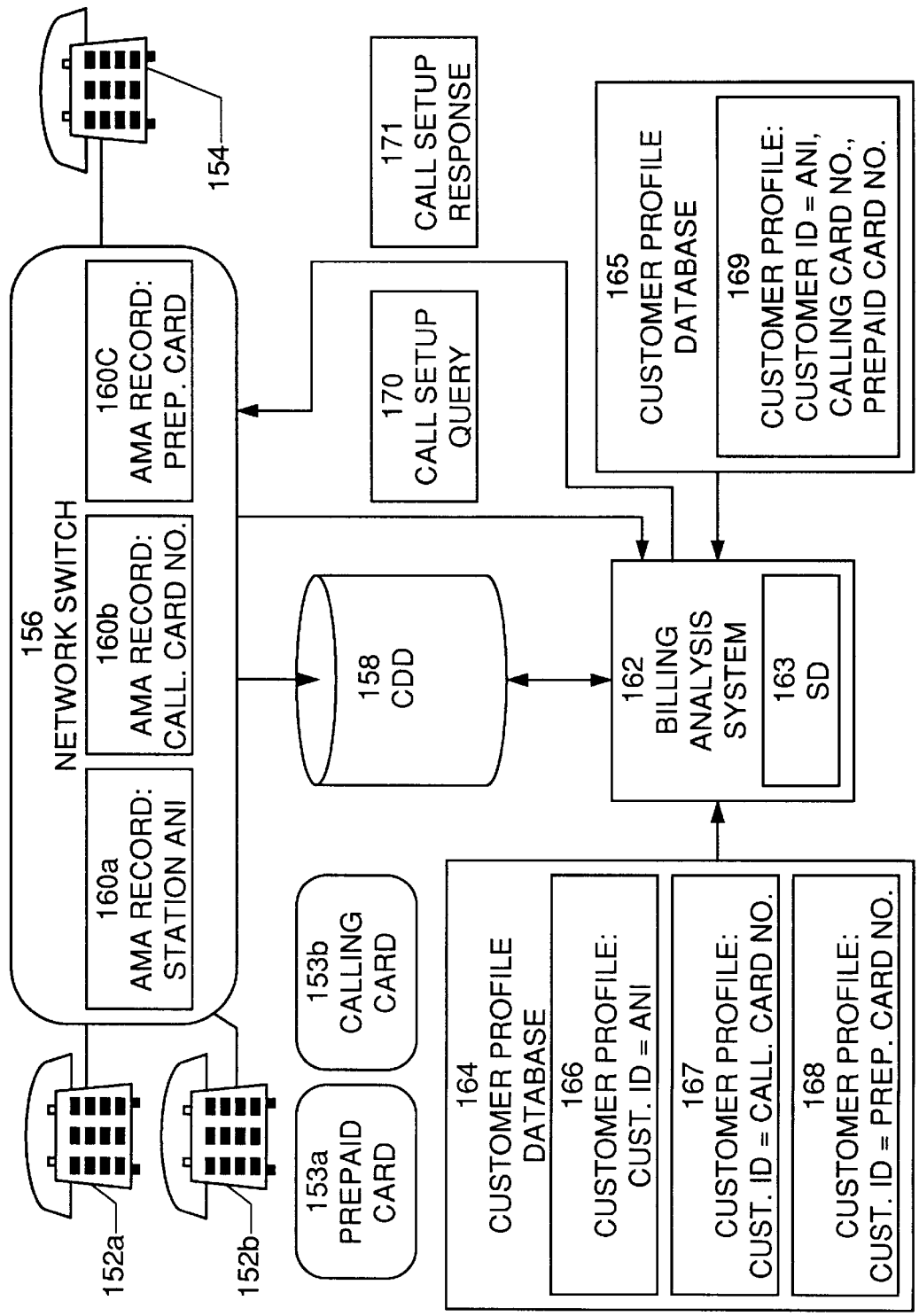
FIG. 1b is a block diagram of the telephone call billing system of FIG. 1a, showing a customer profile database according to the present invention.

The processing involved in customer profile based calling card or prepaid telephone card billing is shown in FIG. 1b, which, as an example, shows the present invention implemented in the telephone billing system of FIG. 1a. The present invention may be similarly implemented in the telephone billing systems shown in FIGS. 3 and 4.

A customer may place a call from a residential or business telephone station for which the customer is the subscriber, such as telephone station 152a. Such a station is termed a customer station. The call is routed through a network switch 156, which generates a corresponding AMA record 160a. AMA record 160a includes an identifier indicating the customer that placed the call. Typically, the Automatic Number Identification (ANI) is used to as the customer identifier. In an ANI system, the number of the telephone station from which a call is initiated is determined and used to identify the party who initiated the call.

The customer may also place a call from any telephone station, such as station 152b, using calling card 153a or prepaid telephone card 153b. The call is routed through a network switch 156, which generates a corresponding AMA record 160b or 160c. AMA record 160b or 160c includes an identifier indicating the customer that placed the call. When a calling card is used to place the call, the calling card account number is typically used as the customer identifier. When a prepaid telephone card is used to place the call, the prepaid telephone card account number is typically used as the customer identifier.

Each AMA record is passed to CDD 158, making the record available for call pricing. Each AMA record is passed from CDD 158 to billing analysis system 162, which applies the customer specific billing parameters contained in the attached customer profile database, such as database 164 or database 165. The customer profile for a particular customer is accessed using the customer identifier included in the AMA record.

In the embodiment of customer profile database 164, each customer has two or more customer profiles, each accessed using a different customer identifier. In this example, customer profile 166 is accessed using the ANI of the customer station as the customer identifier, customer profile 167 is accessed using the customer's calling card account number as the customer identifier and customer profile 168 is accessed using the prepaid calling card account number as the customer identifier.

In the embodiment of customer profile database 165, each customer has only one customer profile, but the profile may be accessed using two or more different customer identifiers. In this example, customer profile 165 may be accessed using either the ANI of the customer station, the customer's calling card account number, or the prepaid telephone card account number, as the customer identifier Each customer profile includes billing parameters that indicate billing actions to be taken for that customer. The billing parameters are defined based on the customer's subscribed calling plans. For example, a customer profile may include a discount parameter indicating that the customer is to receive a discount of 10% once customer A's total usage reaches $50.00. In the embodiment of customer profile database 165, there is only one set of billing parameters that is applied to all calls made by the customer, regardless of whether the calls were made from the customer station or using the customer's calling card or prepaid telephone card. Thus, in this embodiment, a customer's subscribed calling plans are automatically applied to calls the customer makes using a calling card or prepaid telephone card.

In the embodiment of customer profile database 164, there are two or more distinct customer profiles for each customer. Thus, it is possible for each of the customer profiles to contain different billing parameters, causing calls made using the customer's calling card or prepaid telephone card to be billed differently than calls made from the customer station. However, in the present invention, the billing parameters in all customer profiles corresponding to each customer are defined to be the same, based on the customer's subscribed calling plans. Thus, in this embodiment, a customer's subscribed calling plans are also applied to calls the customer makes using a calling card or prepaid telephone card.

For each AMA record received, billing analysis system 162 accesses the customer profile for the customer using the customer identifier in the AMA record and obtains the billing parameters for the customer. The AMA record is then processed according to the accessed billing parameters.

Additional processing is involved when a call is placed using a prepaid telephone card. A prepaid telephone card allows a customer to obtain a designated amount of telephone usage, measure either monetarily or by time usage. When a call is placed using a prepaid telephone card, the usage balance remaining on the card must be verified to determine that a sufficient balance is available to allow completion of the call. The verification processing occurs once a call from calling station has been routed to network switch 156, before the call is completed to the destination station. For example, a customer places a call from calling station 152b to destination station 154, using prepaid card 153a. The call is routed to a network switch 154, which recognizes that a prepaid card was used and generates a call setup query 170, beginning the call setup phase. Switch 156 transmits query 170to billing analysis system 162. The call setup query includes information identifying the customer that placed the call and information identifying the destination of the call and may include other information.

Upon receiving query 170, billing analysis system 162 accesses a customer profile database and obtains the customer specific information contained in the corresponding customer profile, either profile 167 or profile 169. In particular, billing analysis system 162 obtains summary parameters relating to the prepaid telephone card being used. Billing analysis system 162 accesses summary database 163 and obtains the customer's summary information for the prepaid telephone card, which includes the current balance of the card. Billing analysis system 157 determines whether the card balance is sufficient to allow completion of the call and generates a call setup response 171 indicating whether the call should be completed. Upon receiving response 171, network switch 156 completes or rejects the call accordingly.

FIG. 2a shows, in flowchart form, a procedure that a billing analysis system may use to perform billing processing for each call. In the following description of the flowchart references will be made to the embodiment shown in FIG. 1b.

Upon receiving an AMA record, such as 160a–c from CDD 158, the first step billing analysis system 162 takes is to rate the call (step 202). It must then match the rated call to the customer (step 204) so that customer specific parameters can be applied to the call. The technique used depends upon the telephone station from which the call was placed. If the call was placed from a customer station, such as station 152a, the Automatic Number Identification (ANI) is be used to match the rated call to the customer. In an ANI system, the number of the telephone station from which a call is initiated is determined and used to identify the party who initiated the call. If the call was placed from any telephone station, such as station 152b, using a calling card, such as calling card 153b, or using a prepaid telephone card, such as card 153a, the card account number is used to identify the party who initiated the call.

Accordingly, in the FIG. 1b embodiment, the identity of the customer placing the call may be determined and passed to the billing analysis system along with the AMA record. The billing analysis system may then cross-reference the customer identifier to the customer profile containing the customer specific data to be used for the current call. For example, AMA record 160a, which relates to a call placed from a customer station, is cross-referenced to customer profile 166 (in the embodiment of customer profile database 164), which relates to that customer. Once the appropriate profile has been determined, the billing analysis system applies the billing parameters contained in profile 166 to the rated call to produce a priced call value (step 206).

AMA record 160b, which relates to a call placed using a customer's calling card, is cross-referenced to customer profile 167 (in the embodiment of customer profile database 164), which relates to the customer. Once the appropriate profile has been determined, the billing analysis system applies the billing parameters contained in profile 167, which are the same as the billing parameters contained in profile 166, to the rated call to produce a priced call value (step 206).

AMA record 160c, which relates to a call placed using a customer's prepaid telephone card, is cross-referenced to customer profile 168 (in the embodiment of customer profile database 164), which relates to the customer. Once the appropriate profile has been determined, the billing analysis system applies the billing parameters contained in profile 168, which are the same as the billing parameters contained in profile 166, to the rated call to produce a priced call value (step 206).

The customer profile also indicates the summary information that is to be updated. For example, in the case of a call placed from a customer station or using a customer calling card, the priced call value is added to the customer's previous balance to create a new balance, or "current bill" (step 208). In the case of a call placed using a prepaid calling card, the priced call value is subtracted from the previous balance of the card to create a new balance remaining on the card (step 208).

Finally, the priced call value (processed AMA record) for the customer is stored in the CDD, and the current bill and other summary information for the customer is stored in the SD (step 212). As described in relation to FIG. 1a, an alternative scheme is to store both the priced call value and current bill—collectively termed "the priced call data"—in the SD; in which case, step 212 would involve storing the priced call value and the current bill in the SD.

As an optional step in the procedure of FIG. 2, the billing analysis system may adjust charges for old calls to reflect certain types of billing plans (step 210). For example, a customer may subscribe to a plan in which the customer receives a conditional 10% discount on all calls, the condition being that the customer exceed $50.00 in total charges for a given billing period. In such a scenario, calls will initially be billed at the full rate, until such time that the customer reaches $50.00 in total charges. Thus, if the customer does reach $50.00 before the end of the billing period, not only will successive calls need to be discounted by 10%, but all previous calls will need to be discounted by 10%. This requires that prices generated for the previous calls be retroactively adjusted. Call prices will be adjusted regardless of whether the calls were made from the customer station or using the customer's calling card or prepaid telephone card.

Figure 2B:
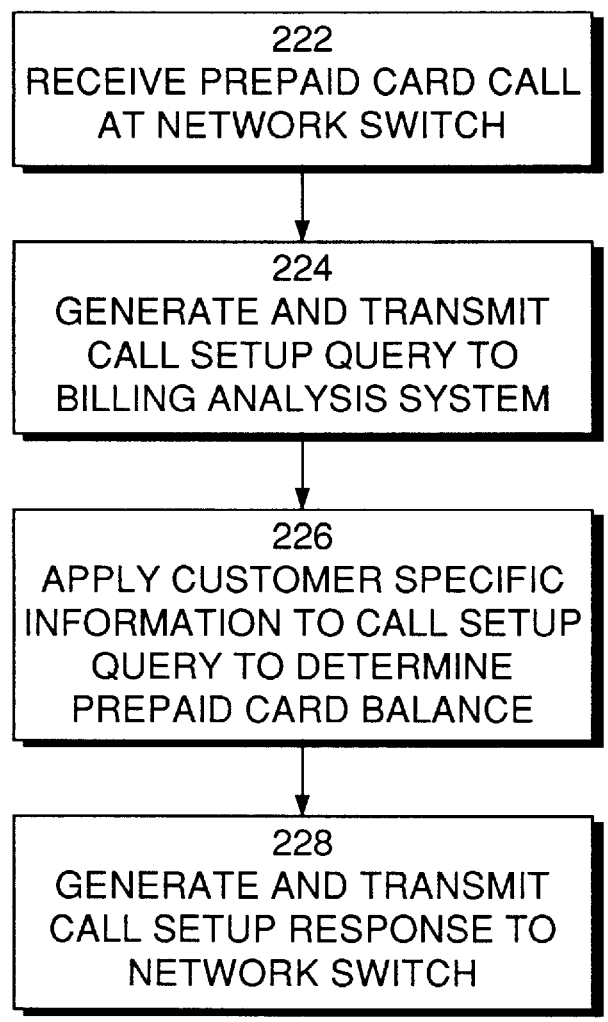
FIG. 2b is a flowchart depicting the steps involved in a procedure in which a balance remaining of a prepaid telephone card is verified, according to the present invention.

FIG. 2b shows, in flowchart form, a verification process for prepaid telephone card calls. The process begins with a call made using a prepaid telephone card being received at a network switch 156 (step 222). Network switch 156 determines that the call was placed using a prepaid telephone card and generates and transmits a call setup query 170 to a billing analysis system 162 (step 224). The call setup query 170 includes information identifying the customer that placed the call, which is typically the card account number, and information identifying the destination of the call and may include other information. Billing analysis system 162 applies the customer specific information, to the information in the call setup query and determines the remaining balance of the prepaid telephone card (step 226). Billing analysis system 162 generates a call setup response 171, which indicates whether the call should be completed, based on the remaining balance (step 228). Billing analysis system 157 then transmits the call setup response 171 to the network switch 156 (step 228), which handles the call as indicated in the response.

Figure 3:
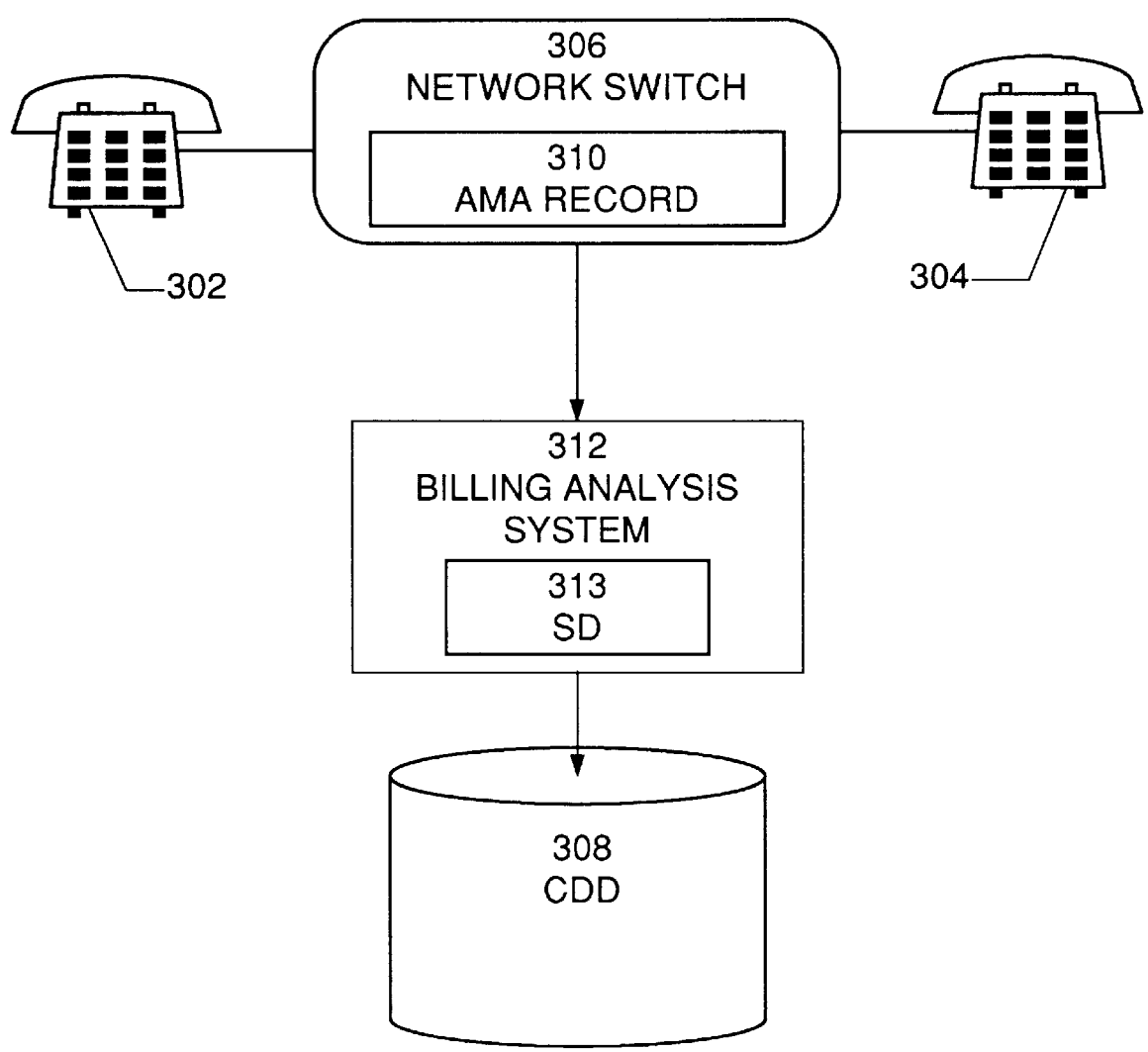
FIG. 3 is a block diagram of another embodiment a telephone call billing system, in which the present invention may be implemented.

Referring now to FIG. 3, there is shown an alternative embodiment of a telephone system in accordance with the present invention. The customer profiles are not shown, but are similar to those shown in FIG. 1b. As shown in the figure, a call may be initiated at a first telephone 302 and directed to a second telephone 304. The call is routed by a network switch 306, which generates an AMA record 310 for the call. The AMA record is passed to a billing analysis system 312 which applies customer specific parameters to the AMA record to produce a processed AMA record. The AMA record and processed AMA record are then passed to a CDD 308 for storage.

Like the billing analysis system of FIG. 1b, the billing analysis system of FIG. 3 includes a SD 313. The billing analysis system of FIG. 3 also includes an integrated customer profile —although, it should be noted that for simplicity of presentation the individual customer profile databases are not shown in FIG. 3, nor in the figures that follow. Also, like the billing analysis system of FIG. 1a, the billing analysis system of FIG. 3 accumulates summary information as each individual call record is received and rated in real-time, the summary information being stored in the SD 313. As in the prior described embodiment, alternative schemes may be employed for the storage of the AMA records, processed AMA records, and summary information.

Figure 4:
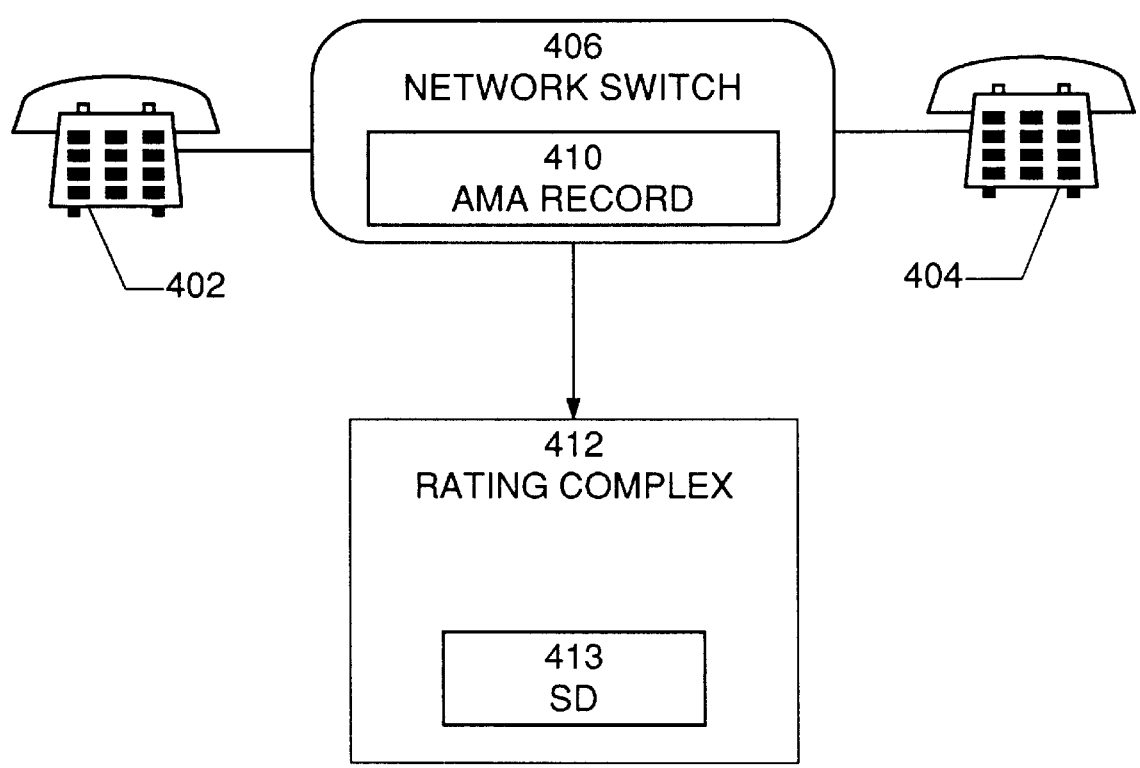
FIG. 4 is a block diagram of another embodiment a telephone call billing system, in which the present invention may be implemented.

FIG. 4 shows another embodiment of a telephone system in accordance with the present invention. The customer profiles are not shown, but are similar to those shown in FIG. 1b. In the FIG. 4 embodiment, as in the previous embodiments, a call initiated at a first telephone 402 may be directed to a second telephone 404 through a network switch 406, which generates an AMA record 410. However, in the FIG. 4 embodiment the AMA record is passed to a Rating Complex (RC) 412. The RC is a unit which performs the functions of the CDD and billing analysis system, and may therefore be characterized as a combined CDD and billing analysis system. As shown in the figure, the RC may include a SD 413 for storing the summary information separately from the AMA records and processed AMA records. As in the prior described embodiments, alternative schemes may be employed for the storage of the AMA records, processed AMA records, and summary information.

It should be noted that although all three embodiments discussed above depict a call as being initiated from a first telephone and directed to a second telephone, it is possible that calls may be initiated by, and directed to, many different types of communication devices. For example, a call may be initiated by a fax machine and directed to a personal computer. Moreover, a call may be initiated by a single communication device and directed to multiple communication devices. For example, a call may be initiated by a fax machine and directed to multiple independent personal computers. For purposes of this description, each instance of a single initiating call being directed to a different terminating device will be considered an independent call.

Although specific embodiments of the present invention have been described, it will be understood by those of skill in the art that there are other embodiments which are equivalent to the described embodiments. Accordingly, it is to be understood that the invention is not to be limited by the specific illustrated embodiments, but only by the scope of the appended claims.

What is claimed is:

1. A method of pricing a call made over a network by a customer of the network, comprising the steps of:

storing information specifying a billing plan of the customer;

receiving a call made from a customer station or using a customer calling card or a prepaid telephone card at a network switch;

completing the call;

generating a record that describes the call, the record comprising information relating to the call and an identifier, the identifier comprising an automatic number identification of the customer station, if the call was made from the customer station, a calling card account number of the customer calling card, if the call was made using the customer calling card, or a prepaid telephone card account number of the prepaid telephone card, if the call was made using the prepaid calling card;

receiving the record at a billing analysis system;

accessing the information specifying the customer billing plan using the identifier in the received record;

determining a priced call value for the call based on the information relating to the call and the information specifying the customer billing plan.

2. The method of claim 1, further comprising the step of:

updating a current bill of the customer by adding the priced call value to a balance of the customer.

3. The method of claim 2, wherein the priced call value incorporates one or more discounts to which the customer is entitled.

4. The method of claim 1, further comprising the step of:

storing information relating to a total usage by the customer.

5. The method of claim 1, wherein the pricing step includes pricing the call based on the total usage by the customer.

6. The method of claim 1, further comprising the steps of:

verifying that a sufficient balance remains before completing the call, if the call was placed using a prepaid telephone card.

7. The method of claim 6, wherein the verifying step comprises the steps of:

generating a call setup query including an identifier of the prepaid telephone card at the network switch;

receiving the call setup query at the billing analysis system;

accessing the balance remaining of the prepaid telephone card using the identifier; and transmitting a call setup response indicating whether the call is to be completed based on the balance remaining, to the network switch.

8. A system for pricing a call made over a network by a customer of the network, comprising:

a database storing information specifying a billing plan of the customer;

a network switch receiving a call made from a customer station or using a customer calling card or a prepaid telephone card, completing the call and generating a record that describes the call, the record comprising information relating to the call and an identifier, the identifier comprising an automatic number identification of the customer station, if the call was made from the customer station, a calling card account number of the customer calling card, if the call was made using the customer calling card, or a prepaid telephone card account number of the prepaid telephone card, if the call was made using the prepaid calling card; and a billing analysis system receiving the record, accessing the information specifying the customer billing plan using the identifier in the received record and determining a priced call value for the call based on the information relating to the call and the information specifying the customer billing plan.

9. The system of claim 8, wherein the billing analysis system further:

updates a current bill of the customer by adding the priced call value to a balance of the customer.

10. The system of claim 9, wherein the priced call value incorporates one or more discounts to which the customer is entitled.

11. The system of claim 8, wherein the billing analysis system further:

stores information relating to a total usage by the customer.

12. The system of claim 11, wherein the billing analysis system further:

prices the call based on the total usage by the customer.

13. The system of claim 8, wherein before the call is completed:

the network switch further generates a call setup query including an identifier of the prepaid telephone card at the network switch;

the billing analysis system further receives the call setup query, accesses the balance remaining of the prepaid telephone card using the identifier and transmits a call setup response indicating whether the call is to be completed based on the balance remaining.

14. A system for pricing a call made over a network by a customer of the network, comprising:

means for storing information specifying a billing plan of the customer;

means for receiving a call made from a customer station or using a customer calling card or a prepaid telephone card;

means for completing the call;

means for generating a record that describes the call, the record comprising information relating to the call and an identifier, the identifier comprising an automatic number identification of the customer station, if the call was made from the customer station, a calling card account number of the customer calling card, if the call was made using the customer calling card, or a prepaid telephone card account number of the prepaid telephone card, if the call was made using the prepaid calling card;

accessing the information specifying the customer billing plan using the identifier in the received record; and means for determining a priced call value for the call based on the information relating to the call and the information specifying the customer billing plan.

15. The system of claim 14, further comprising:

means for updating a current bill of the customer by adding the priced call value to a balance of the customer.

16. The system of claim 15, wherein the priced call value incorporates one or more discounts to which the customer is entitled.

17. The system of claim 14, further comprising:

means for storing information relating to a total usage by the customer.

18. The system of claim 14, wherein the determining means comprises:

means for pricing the call based on the total usage by the customer.

19. The system of claim 14, further comprising:

means for verifying that a sufficient balance remains before completing the call, if the call was placed using a prepaid telephone card.

20. The system of claim 19, wherein the verifying means comprises:

means for generating a call setup query including an identifier of the prepaid telephone card;

means for receiving the call setup query;

means for accessing the balance remaining of the prepaid telephone card using the identifier; and means for transmitting a call setup response indicating whether the call is to be completed based on the balance remaining.

* * * * *